(12) United States Patent
Zhao et al.

(10) Patent No.: US 11,352,025 B2
(45) Date of Patent: Jun. 7, 2022

(54) CONTROL METHOD AND SYSTEM OF UNMANNED LOGISTICS VEHICLES

(71) Applicant: Move-X Autonomous Driving Technology Co., Ltd., Lu'an (CN)

(72) Inventors: Guoliang Zhao, Lu'an (CN); Hui Zhang, Lu'an (CN); Xijiong Ling, Lu'an (CN); Yingjia Wu, Lu'an (CN)

(73) Assignee: Move-X Autonomous Driving Technology Co., Ltd., Lu'an (CN)

( * ) Notice: Subject to any disclaimer, the term of this patent is extended or adjusted under 35 U.S.C. 154(b) by 0 days.

(21) Appl. No.: 17/478,937

(22) Filed: Sep. 19, 2021

(65) Prior Publication Data
US 2022/0111872 A1    Apr. 14, 2022

(30) Foreign Application Priority Data

Oct. 12, 2020   (CN) .......................... 202011084817.3

(51) Int. Cl.
| | | |
|---|---|---|
| *B60W 60/00* | (2020.01) | |
| *G06Q 10/08* | (2012.01) | |
| *G05D 1/00* | (2006.01) | |
| *G06F 3/01* | (2006.01) | |
| *G06F 3/16* | (2006.01) | |

(52) U.S. Cl.
CPC ..... *B60W 60/00256* (2020.02); *G05D 1/0022* (2013.01); *G06F 3/017* (2013.01); *G06F 3/16* (2013.01); *G06Q 10/083* (2013.01); *B60W 2540/21* (2020.02); *B60W 2554/80* (2020.02)

(58) Field of Classification Search
CPC ....... B60W 60/00256; B60W 2540/21; B60W 2554/80; G05D 1/0022; G05D 1/0246; G05D 1/0214; G05D 1/0257; G05D 1/0259; G05D 1/0285; G05D 2201/0212; G06F 3/017; G06F 3/16; G06Q 10/083
See application file for complete search history.

(56) References Cited

U.S. PATENT DOCUMENTS

| | | | |
|---|---|---|---|
| 10,180,332 B2 * | 1/2019 | Yu ....................... | G01C 21/3438 |
| 10,877,480 B1 * | 12/2020 | Arden ..................... | B60R 25/24 |
| 2017/0123421 A1 * | 5/2017 | Kentley ................. | G06Q 10/00 |
| 2018/0157268 A1 * | 6/2018 | Mangal .................. | G06F 3/017 |
| 2019/0137290 A1 * | 5/2019 | Levy .................... | G01C 21/3461 |
| 2020/0050211 A1 * | 2/2020 | Donnelly ........... | B60H 1/00742 |

* cited by examiner

*Primary Examiner* — Nga X Nguyen
(74) *Attorney, Agent, or Firm* — Fideli Law PLLC

(57) ABSTRACT

The present disclosure provides a method and system for controlling an unmanned logistics vehicle. The control method of the unmanned logistics vehicle comprises: when an unmanned logistics vehicle remains at a shipping location/pickup location, when a feature instruction of a user is recognized, the unmanned logistics vehicle is controlled to drive away from the shipping location/pickup location; and the feature instruction comprises at least one of a voice instruction, a limb action instruction, a fingerprint unlocking instruction and a facial expression instruction. The present disclosure increases the safety, efficiency, and intelligence of unmanned logistics vehicle operation, and enhances user experience.

20 Claims, 4 Drawing Sheets

CONTROL METHOD AND SYSTEM OF UNMANNED LOGISTICS VEHICLES

RELATED APPLICATIONS

This application claims the benefit of priority to Chinese Patent Application No. 202011084817.3, filed on Oct. 12, 2020, and the entire contents of which are incorporated herein in its entirety.

TECHNICAL FIELD

The present disclosure relates to the technical field of unmanned vehicles, in particular to a control method and system of unmanned logistics vehicles.

BACKGROUND

As the autonomous driving technology grows and advances, the application scenarios of unmanned vehicles are increasing. One application is an unmanned logistics vehicle. Human work such as goods logistics and commodity selling may be replaced in a certain area. As the autonomous driving technology becomes mature, the unmanned vehicles can replace humans workers, but the present technical scheme still has the following drawbacks:

1. After the unmanned vehicle delivers the goods to a designated target location, to user takes the goods out, the unmanned vehicle stays for a preset time and then leaves for the next destination. The disadvantage of this method is that the preset time length may not be suitable for each user; different users may need different time periods and have different manners to picking up the goods and then leaves the vehicle. Accordingly, if the preset time is too long, the unmanned vehicle may still remain at the location after the user leaves, which may reduce the delivery efficiency. However, if the preset time is too short, the user experience may be undesirable, and some unexpected safety problems may occur. For example, a user may scan the code with a mobile phone, and then leaves the mobile phone on the unmanned vehicle in order to take out the goods. After the compartment door is closed, the unmanned vehicle may immediately leave the location to drive towards the next destination. In this case, the user may not be able to get the mobile phone back, or the mobile phone may be lost or broken by accident.

2. After the unmanned vehicle delivers the goods to a designated target location, a user takes the goods out, and then the unmanned vehicle determines whether to drive away towards the next destination by detecting a relative positional relationship between the vehicle and the user. The disadvantage of this method is that some users may remain in the vicinity of the vehicle after goods pickup, resulting in the unmanned vehicle unnecessarily staying at that location. This may reduce the efficiency.

3. After the unmanned vehicle delivers the goods to a designated target location, the user takes out the goods, closes the compartment door, and the unmanned vehicle then drives away towards the next destination upon receiving the door closing signal. The disadvantage of this method is that some users may forget to close the compartment door, resulting in the unmanned vehicle unnecessarily staying at that location.

4. Overall, the technical scheme with the above methods lacks of interaction between the unmanned vehicle and the user, and the practicability and adaptability thereof are not desirable.

In addition, a similar problem may occur in the scenario when an unmanned vehicle unnecessarily stays at a loading location.

SUMMARY

The technical problem to be solved by the present disclosure is how to effectively control the driving off of an unmanned logistics vehicle after shipping or pickup.

To address the preceding technical problem, the disclosure discloses a method for controlling an unmanned logistics vehicle, including: during the unmanned logistic vehicle staying at a target location, controlling, by a control system in the unmanned logistics vehicle, the unmanned logistics vehicle to drive away from the target location upon recognizing a feature instruction from a user, where the target location is at least one of a shipping location or a pickup location, and the feature instruction includes at least one of a voice instruction, a body movement instruction, a fingerprint unlocking instruction, or a facial expression instruction.

The disclosure discloses a control system for an unmanned logistics vehicle, including: a voice recognition module; an action recognition module; and a control module, where the voice recognition module, the action recognition module and the control module are integrated to the unmanned logistics vehicle, the control module includes: at least one storage medium storing a set of instructions for controlling the unmanned logistics vehicle, and at least one processor in communication with the at least one storage medium, where during operation, the at least one processor executes the set of instructions to, during the unmanned logistic vehicle staying at a target location: control the unmanned logistics vehicle to drive away from the target location upon recognizing a feature instruction from a user, where the target location is at least one of a shipping location or a pickup location, and the feature instruction includes at least one of a voice instruction, a body movement instruction, a fingerprint unlocking instruction, or a facial expression instruction.

Compared with the existing technologies, the technical scheme at least has the following beneficial effects:

The recognition of the feature instruction of the user is added on the unmanned logistics vehicle, so that the unmanned logistics vehicle remaining at the shipping or pickup location can control the vehicle to start autonomous driving by recognizing the features of the user (including voice, gesture, fingerprint, limb action, and facial expression), thereby realizing effective, intelligent and safe control of the unmanned logistics vehicle driven away from the shipping location/pickup location.

By detecting the distance between the user and the unmanned logistics vehicle, the open and closed state of the compartment door, the outstanding stay time, the unmanned logistics vehicle can be controlled to drive away towards the next destination under the condition that the user leaves without closing the compartment door, preventing the unmanned logistics vehicle from affecting the logistics transportation efficiency due to the outstanding stay of the unmanned logistics vehicle.

The disclosure discloses a voice reminder function of an unmanned logistics vehicle. For example, the user is reminded of safety before driving off, and to close the door under the condition that the user takes the goods but does not close the compartment door, so that the unmanned logistics vehicle is more safely driven away from the shipping location/pickup location.

By means of the association of the client and server of the consignor and consignee, the feature instruction of the consignor and consignee is associated with the cargo information, and the one-to-one and location-to-location instruction ways also increase the safety of the logistics process and enhance the accuracy of goods shipping.

Through user-defined feature instruction, interaction between unmanned logistics vehicles becomes interesting.

In summary, the unmanned logistics vehicle according to the scheme of the present disclosure has the advantages of increasing the interaction of the user and the unmanned logistics vehicle (including voice, gesture, fingerprint, limb action, and facial expression) after the user has finished delivering or picking up goods, completing the control scheme for when the unmanned logistics vehicle is driven off, so that the unmanned logistics vehicle can drive away towards the next destination more intelligently, thereby increasing the safety, efficiency and intelligence of the operation of the unmanned logistics vehicle, and enhancing the user experience. Therefore, the scheme provided by the disclosure has the advantages of logic, practicability and adaptability, and better conforms to the actual application scenarios.

BRIEF DESCRIPTION OF THE DRAWINGS

To illustrate the technical scheme in exemplary embodiments of the disclosure, the following briefly introduces the drawings needed in the description of those exemplary embodiments. It is obvious that the drawings in the following description cover only some exemplary embodiments of the present disclosure. Other drawings may be obtained by a person skilled in the art without creative work.

DETAILED DESCRIPTION

The technical schemes of some exemplary embodiments of the present disclosure will be described in detail hereinafter with reference to the accompanying drawings. It is apparent that the described embodiments are merely a part of embodiments of the present disclosure. All other embodiments obtained by one of ordinary skill in the art based on these exemplary embodiments are within the scope of the present disclosure.

With advances in technology, unmanned vehicle technology tends to be mature, and covers more extensive application scenarios in daily life. In the present application, the recognition of a feature instruction of a user is added on an autonomous driving logistics vehicle, and the feature instruction includes at least one of a voice instruction, a body movement instruction, a fingerprint unlocking instruction, and a facial expression instruction. The feature instruction may be utilized to trigger an unmanned logistics vehicle to autonomously drive away from a station, such that the unmanned logistics vehicle may be effectively and intelligently controlled, and the driving safety may be improved to a certain extent.

Figure 1:
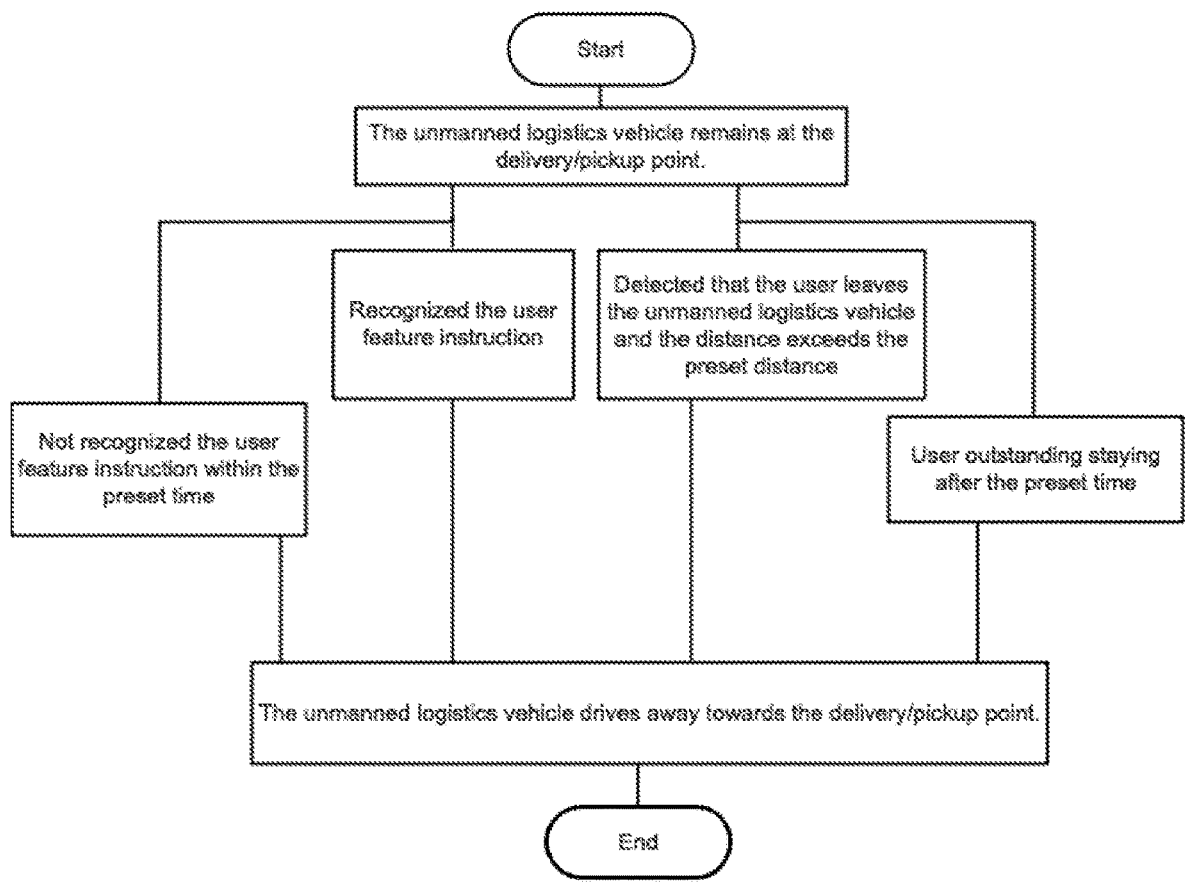
FIG. 1 is a flowchart of a method for controlling the unmanned logistics vehicle according to some exemplary embodiments of the present disclosure.

Referring to FIG. 1, a control method of an unmanned logistics vehicle according to some exemplary embodiments may include: an unmanned logistics vehicle stays at a shipping location/pickup location, when a feature instruction of a user is recognized; the unmanned logistics vehicle is controlled to drive away from the shipping location/pickup location.

The feature instruction may be a voice instruction, a body movement instruction, a fingerprint unlock instruction, a facial expression instruction, or the like, or a combination thereof. The voice instruction may be recognized by a voice recognition module (including, for example, a sound input device, which may be a microphone), the body movement instructions (including gestures, leg and foot actions, body actions, etc.), and facial expression instructions may be recognized by a movement (for example, gesture, facial or body movement) recognition module (including, for example, an image input device, which may be a camera).

The feature instruction of a user at a shipping location/pickup location may be preset or set by the user. Specifically, the feature instruction of the user at the shipping location/pickup location may be preset, for example, the feature instruction of the user may be preset and stored in a server that is in communication with the unmanned logistics vehicle (an unmanned vehicle background control server)), a user at the shipping location/pickup location may obtain the preset feature instruction from the server through a client (typically a portable electronic device or a program installed on an electronic device, such as a mobile phone of the user, or an application (APP) installed on a mobile phone) as a default feature instruction, for example, the default voice instruction may be "I have put in the goods, please leave", "I have picked up the goods, please leave"; the default body movement instruction may be a gesture indicating letting "go" or "come" (by waving hand). The feature instruction may also be personalized by the user at the shipping location/pickup location through the client (for example, an unmanned vehicle application (App) installed on the user's mobile phone). For example, personalized voice instructions may include "I have picked up my goods. Run"; personalized body movement instructions may include "pushing", "fisting", "leg sweeping", "kicking" and the like; or may be a combination thereof, such as waving hand and saying, "Run". The user may use the set feature instructions after goods shipping/pickup, and the unmanned logistics vehicle autonomously drives off the shipping location/pickup location after the feature instruction is recognized by the unmanned logistics vehicle.

Figure 2:
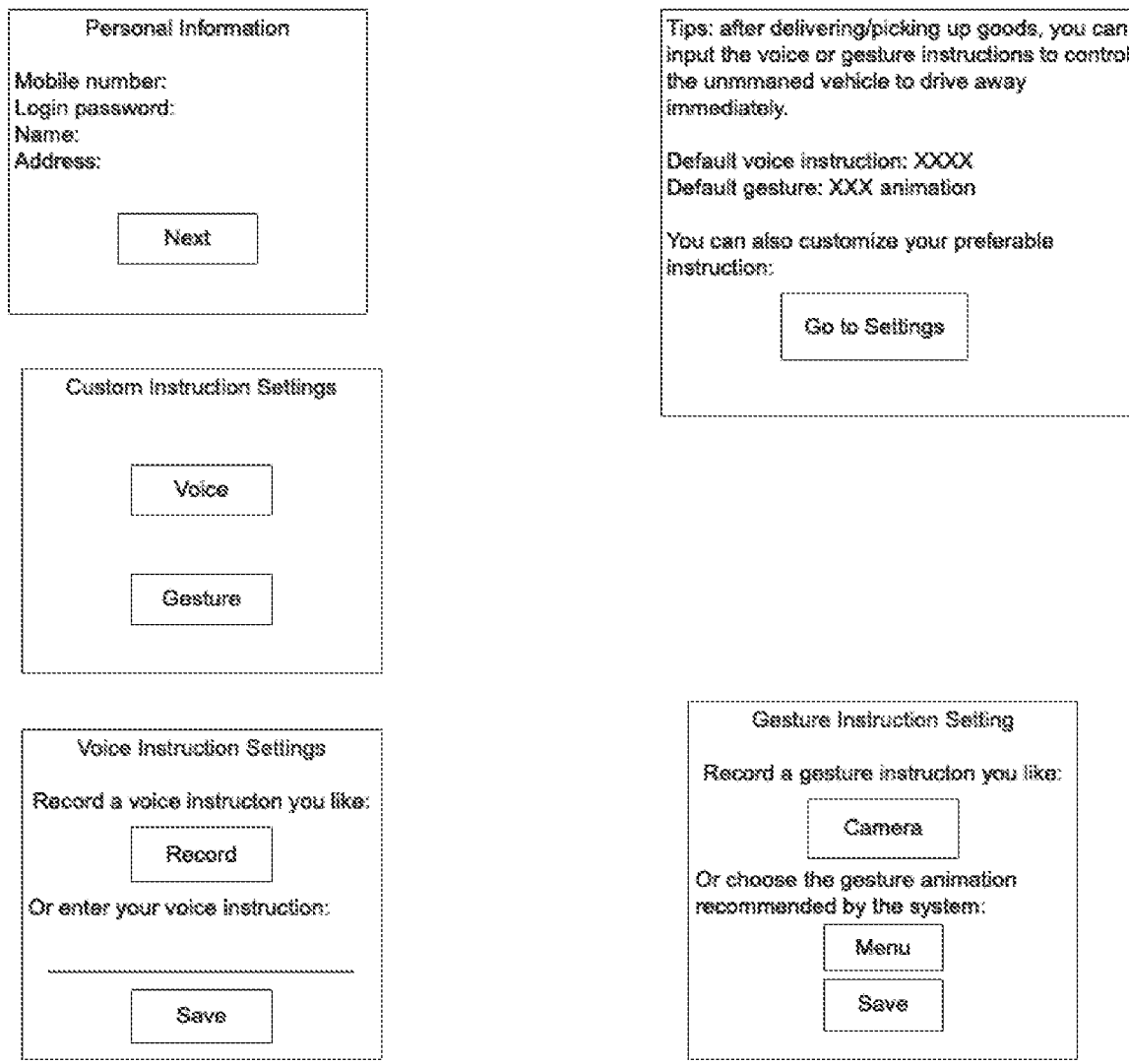
FIG. 2 is a schematic diagram of a display interface of a client for setting feature instructions according to some exemplary embodiments of the present disclosure.

An interface for setting the feature instruction(s) on a client application (APP) installed on the unmanned vehicle may be referred to as the exemplary embodiments shown in FIG. 2, but is not limited thereto. Specifically, taking the voice instruction and gesture instruction setting as an example: when a user registered with the client App is registered, the client may be prompted to provide the basic information, such as name, mobile phone number, address and the like; next, the client may be prompted to set the default voice and gesture instructions for receiving/delivering. The user may be further prompt to determine whether a voice/gesture instruction needs to be customized; if so, the user only needs to record a piece of audio (voice) or a video (body movement) as instructed. Next time, when the user completes goods shipping/pickup, the user only needs to say the customized voice message or perform the customized movement as an instruction, and after a voice recognition module or a body movement recognition module on the unmanned vehicle receives the instruction, the unmanned logistics vehicle drives away autonomously for a next destination.

With continuing reference to FIG. 1, in order to avoid the situation that the logistics transportation efficiency is compromised by allowing the unmanned logistics vehicle to stay at a location for an unnecessary period of time, in some exemplary embodiments of the present disclosure, the control method of the unmanned logistics vehicle may further include: when a feature instruction of the user is not received within a preset staying time of the unmanned logistics vehicle, the unmanned logistics vehicle is controlled to drive away from the shipping location/pickup location. The preset staying time is typically set as a range of time period sufficient to allow a user to load goods into a compartment on the vehicle or pick up goods from a compartment on the vehicle.

Further, the control method of the unmanned logistics vehicle according to some exemplary embodiments of the present disclosure may further include: detecting a distance between the user and the unmanned logistics vehicle; when it is detected that the user leaves the unmanned logistics vehicle and the distance exceeds a preset distance, the unmanned logistics vehicle may be controlled to drive away from the shipping location/pickup location. In addition, in the case where, within the preset staying time of the unmanned logistics vehicle, the user does not leave (the distance between the user and the unmanned logistics vehicle is within the preset distance); the unmanned logistics vehicle is controlled to drive away from the shipping location/pickup location. The preset distance is typically set as a safe distance range that does not pose a danger to the user when the unmanned logistics vehicle drives away.

In some exemplary embodiments of the present disclosure, in order to send the goods to a user (consignee) designated by another user (consignor) as accurately as possible, the feature instructions of the user of the shipping and pickup locations may be associated with the goods information, so that the consignee is corresponded with the consignor, that is, after the goods is loaded to the compartment at the shipping location, the user may use the set feature instruction (which may be associated with the goods information) to control the unmanned logistics vehicle to drive away from the shipping location. After picking up the goods out of the compartment, the user may use the feature instruction associated with the goods information to control the unmanned logistics vehicle to drive away from the pickup location.

In some exemplary embodiments, the feature instruction may be set by a client at a shipping location and uploaded to a server, which is then sent to a client at a pickup location by the server. For example, the consignor user may set feature instructions through the unmanned vehicle application (App) on a mobile phone (a client at the shipping location), and uploads the consignor user information (including a mobile phone number thereof), goods information (such as an ID number of the goods), the feature instruction, and designated consignee user information (including a mobile phone number thereof and a pickup address) to the server (an unmanned vehicle background control server); the server sends the feature instruction to the mobile phone of the designated consignee user. The consignee user picks up the goods by scanning a code (such as a barcode or a QR code) with the unmanned vehicle application (client at the pickup location) to obtain the goods information and the corresponding set feature instruction. After picking up the goods, the consignee user uses the corresponding feature instruction (the feature instruction set by the consignor, which is associated with the goods information) to control the unmanned logistics vehicle to drive away from the pickup location. If the instruction used by the consignee does not match the set feature instruction, the unmanned logistics vehicle sends a voice prompt, "please confirm your goods" to remind the user. When such location-to-location and one-to-one feature instruction setting and implementation, goods may be accurately delivered to the consignee designated by the consignor, so that the probability that the unmanned logistics vehicle drives away under the condition that the user takes the wrong goods may be greatly reduced.

In some exemplary embodiments, the feature instruction of the user may be set by the server and issued to the client of the shipping/pickup location. For example, the consignor user may upload the consignor user information (including a mobile phone number thereof), goods information, the designated consignee user information (including a mobile phone number thereof and a pickup address) to a server (the unmanned vehicle background control serve); the server may set the feature instruction associating goods information and sends to the mobile phones of the consignor user and consignee user. The consignor user may use the unmanned vehicle App (a client at the shipping location) to obtain the feature instruction set by the server, and the consignee may use the unmanned vehicle App (a client at the pickup location) to obtain the feature instruction set by the server. After delivering/picking up the goods, the consignor/consignee user may use the corresponding feature instruction (the feature instruction set by the server, which is associated with the goods information) to control the unmanned logistics vehicle to drive away from the shipping location/pickup location. If the instruction used by the consignee does not match the set feature instruction, the unmanned logistics vehicle issues a voice prompt, "please confirm your goods" to remind the user. With the location-to-location and one-to-one feature instruction setting and implementation, and the goods may be accurately delivered to the consignee designated by the consignor, so that the probability that the unmanned logistics vehicle drives away under the condition that the user takes the wrong goods may be greatly reduced.

Further, in some exemplary embodiments, the user may also be reminded to close the compartment door before the unmanned logistics drives away from the shipping location/pickup location. For example, a voice reminder such as "Please remember to close the compartment door" may be issued. Subsequently, regardless whether the compartment door is closed or not, the unmanned logistics vehicle drives away when at least one of the following conditions is meet: a feature instruction being recognized, the user being detected leaving, or the vehicle exceeding a preset staying time. This may avoid efficiency reduction of the goods shipping caused by unnecessary stay of the vehicle.

Moreover, from aspects of driving safety and goods safety, the unmanned logistics vehicle needs to drive away from a shipping location/pickup location with the compartment door closed. Specifically, sensor arranged on the compartment door may sense that the compartment door is closed, and the unmanned logistics vehicle starts its autonomous driving upon sensing that the close is closed, and a voice reminder "Ready to go" may be issued before starting.

Based on the method for controlling the unmanned logistics vehicle, the control system of the unmanned logistics vehicle in some exemplary embodiments of the present disclosure may include a voice recognition module, an action recognition module, and a control module, integrated in the unmanned logistics vehicle and used for executing the control method. The control module may include at least one storage medium storing a set of instructions for controlling the unmanned logistics vehicle, and at least one processor in communication with the at least one storage medium, where during operation, the at least one processor executes the set of instructions to execute the control method.

Figure 3:
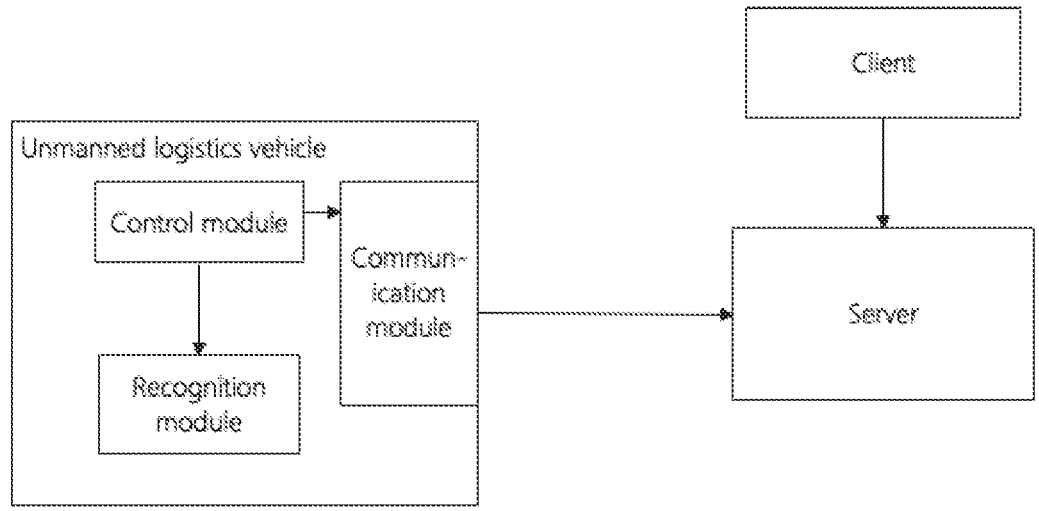
FIG. 3 is a schematic structural diagram of a control system of an unmanned logistics vehicle according to some exemplary embodiments of the present disclosure.

Referring to FIG. 3, the recognition module of some exemplary embodiments may be a voice recognition module, an body movement recognition module, or a combination of a voice recognition module and an action recognition module. The unmanned logistics vehicle may further include a communication module for an interconnection between the unmanned logistics vehicle and the server.

The control system of the unmanned logistics vehicle shown in FIG. 3 may further include a client and a server. The user feature instruction may be set by the client, or by the server. Specifically, the client may be configured to set a feature instruction and upload user information and a set feature instruction to the server; the server may be configured to obtain user information and a set feature instruction from the client; alternatively the server may be configured to set a feature instruction and send the feature instruction to the client to obtain user information from the client, and the client may be configured to upload user information to the server and obtain a set feature instruction from the server.

Further, after the unmanned logistics vehicle acquires the voice or body movement of the user, the system needs to compare the voice signal and the image signal with the set user feature instruction to identify whether the user has sent the instruction to drive the unmanned logistics vehicle to leave. The feature instruction of the user may be compared and recognized by a control module of the unmanned logistics vehicle, that is, an on-board terminal (control module) of the unmanned logistics vehicle may directly compare the acquired voice signal, image signal with the previously set and stored feature instruction of the user, and determine whether they are consistent; or, the feature instruction of the user may also be recognized by the server, that is, the on-board terminal (control module) of the unmanned logistics vehicle may upload the acquired voice signal and/or the image signal to the server through the communication module, the server may compare the acquired voice signal and/or the image signal with the previously set and stored feature instruction of the user, and determine whether they are consistent, and then send back a comparison result to the control module of the unmanned logistics vehicle through the communication module.

An actual implementation process will be described below with reference to the structure and flow chart of an exemplary application of the control system and method of the unmanned logistics vehicle illustrated in FIGS. 4 and 5. Voice and gesture recognition at a pickup location is taken as an example for the description. The actual application is not limited in this example, and may be changed in various actual application scenarios.

Figure 4:
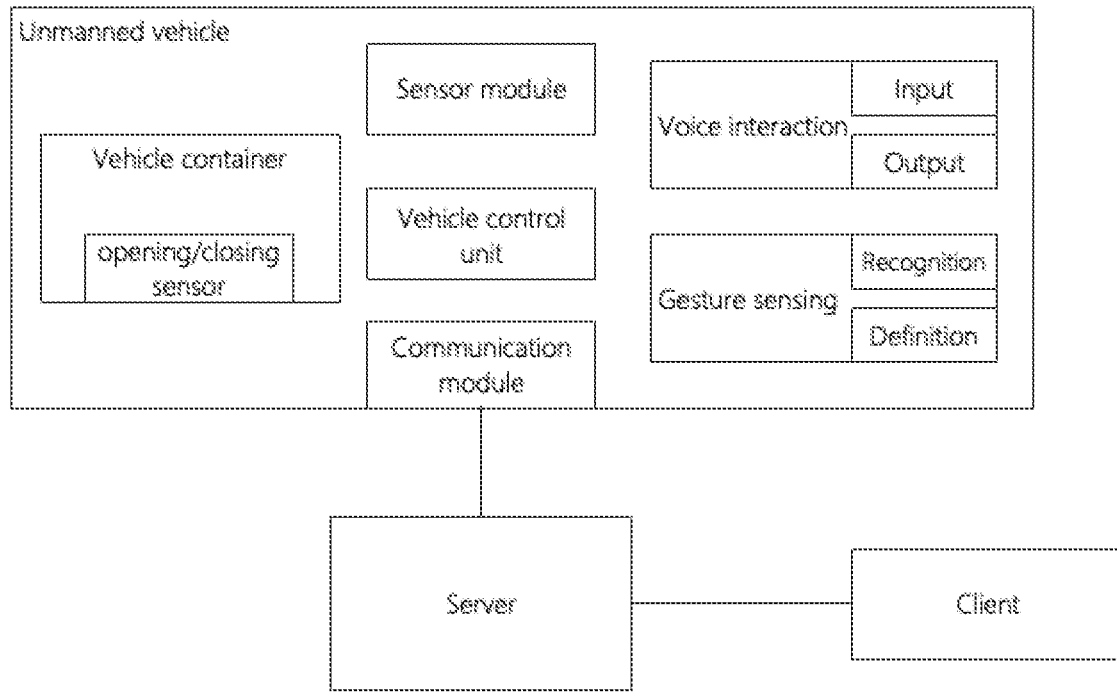
FIG. 4 is a schematic diagram of an application example of a control system of the unmanned logistics vehicle according to some exemplary embodiments of the present disclosure.

Referring to FIG. 4, the unmanned vehicle may be an autonomous driving vehicle that may autonomously drive to a specified location in an application scenario with multiple sensors integrated to the vehicle. The unmanned vehicle sensor module may include a combination of sensors, such as a camera, a radar, an inertial measurement unit (IMU), etc. to sense relative relationship between the vehicle and its surrounding environment by electromagnetic wave detection or image capture. The vehicle control unit of the unmanned vehicle is a central controller of the unmanned vehicle, and may include a main control device for information control of the autonomous driving function and other functions of the vehicle, and the functions of the control module are embedded in the vehicle control unit of the unmanned vehicle. The communication module may be an on-board Telematics BOX (T-Box), a 4G/5G/6G mobile communication module, or a router for implementing the information communication function between the unmanned vehicle and a server(s) and a client(s). A voice interaction module may include a voice input end (such as a microphone) and a voice output end (such as a speaker), and may be connected to an unmanned vehicle controller. A gesture sensing module may include a gesture recognition end and a gesture definition end, which may be configured to set a specific gesture, and recognize the set gesture fed back by the user. Gesture definition may include not only a hand action, but also an action of another body part (such as leg), or a combination thereof. The on-board compartment module may be integrated to the unmanned vehicle, and may include a physical module (such as an express compartment/vending compartment) and a control circuit board, a goods storage conductor, a compartment door opening/closing sensor, and the like. The server may be a remote storage/computing background server, and a network platform that may be in communication with an unmanned vehicle, a user, or other platforms. The client may be embedded with an unmanned vehicle application program (App), and is used for realizing interaction between the user, and the unmanned vehicle and the background server.

Figure 5:
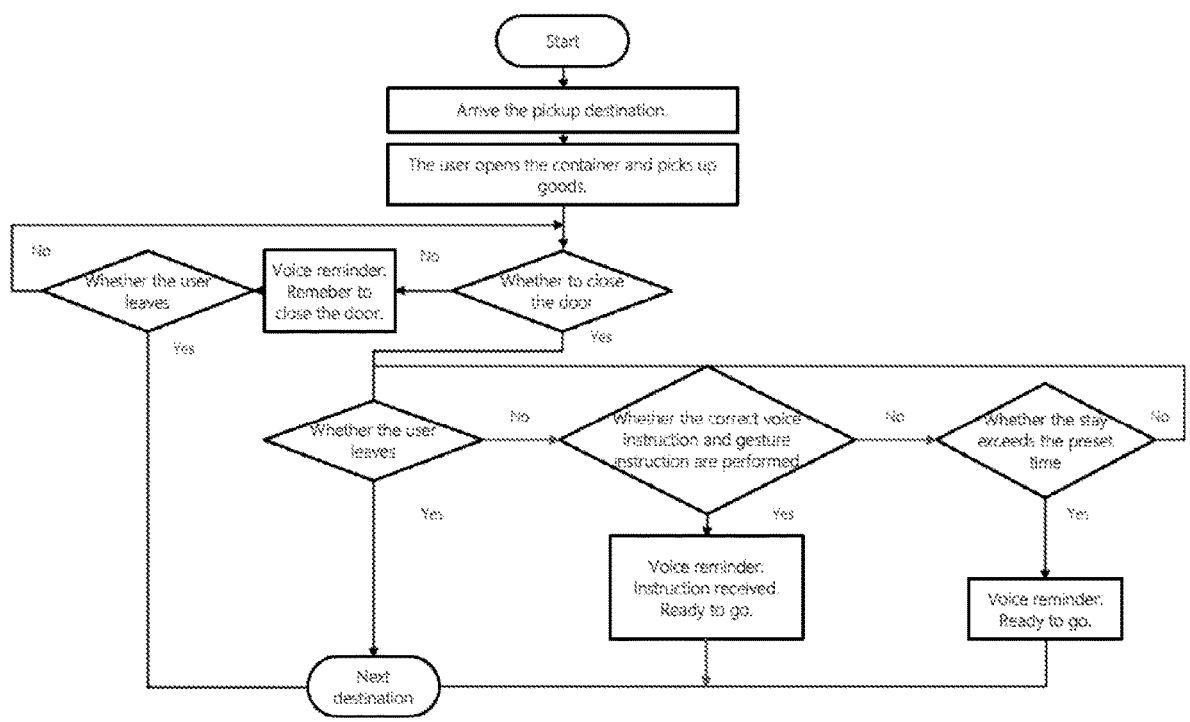
FIG. 5 is a schematic flow diagram of an application example of a control method of the unmanned logistics vehicle according to some exemplary embodiments of the present disclosure.

Referring to FIG. 5, the unmanned vehicle may automatically drives to the destination after receiving the user shipping/pickup instruction. After the unmanned vehicle arrives at the pickup destination, the user opens a corresponding compartment door by scanning a code or other manner, and takes out the goods. The compartment door opening/closing sensor on the unmanned vehicle may then determine whether the compartment door is closed. If the compartment door is closed, the unmanned vehicle sensor module detects the relative positional relationship between the user and the unmanned vehicle, and determines whether the user leaves. If it is detected that the user leaves the unmanned vehicle with a distance that exceeds the preset distance, the unmanned vehicle starts to drive autonomously towards a next destination. If it is detected that the user is within the preset distance (or around the unmanned vehicle), it is determined whether the user performs the correct voice instruction or gesture instruction, that is, whether the voice interaction module or the gesture sensing module recognizes the voice instruction or gesture instruction input by the user. If the correct instruction is received, the voice provides a voice feedback: Instruction received. Ready to go. Thank you. Next, the unmanned vehicle automatically drives to the next destination. If the unmanned vehicle does not detect a voice or gesture instruction, after the unmanned vehicle stays overtime (the unmanned vehicle does not receive a voice or gesture instruction, the user is detected around for a long time), a voice reminder is issued: Ready to go. The unmanned vehicle then automatically drives to the next destination. Moreover, if it is detected that the compartment door is not closed, a voice reminder may be issued: After picking up the goods, please remember to close the compartment door. The unmanned vehicle sensor module detects the relative positional relationship between the user and the unmanned vehicle to determine whether the user leaves. If it is detected that the user does not leave, the compartment state is detected again (in other examples, a voice instruction or gesture instruction input by the user may be detected). If it is detected that the user leaves, the unmanned vehicle autonomously drives to the next destination.

A voice interaction module and a gesture sensing module are added on the unmanned vehicle as a signal input to enable the unmanned vehicle to leave for the next destination. After the user picks up the goods, the user may perform a. In this case, the default voice instruction may be, for example, "I have picked up the goods, please leave". The user may also customize the input voice instruction to the unmanned vehicle as needed. After receiving the instruction, the speaker may respond with, for example, "Instruction received. Ready to go" to give the user a feedback, and then go to the next destination based on its original autonomous driving technical scheme. If the environment of the unmanned vehicle is noisy, the voice instruction input may be interrupted, or a voice input may not be convenient, the user may perform a default gesture instruction, such as actions indicating letting go or come. When the user input information for registration on the App, the user may customize the input gesture instruction as needed. After the unmanned vehicle senses the gesture, the speaker may respond to the user, with "Instruction received. Ready to go", and then drives to the next destination based on its original autonomous driving technical scheme.

In summary, after reading this detailed disclosure, it will be apparent to those skilled in the art that the foregoing detailed disclosure is illustrative, not restrictive. It is appreciated by those skilled in the art that the present disclosure is intended to encompass various changes, modifications, and adaptations to the disclosed embodiments. Such changes, modifications, and adaptations are intended to be set forth by the present disclosure and are within the scope of the present disclosure.

What is claimed is:

1. A method for controlling an unmanned logistics vehicle, comprising:
    controlling, by a control system in the unmanned logistics vehicle, the unmanned logistics vehicle to drive away a shipping location to a pickup location upon determining that goods have been loaded on the unmanned logistics vehicle;
    determining, by the control system, the unmanned logistics vehicle arrives at the pickup location;
    recognizing, by the control system, a feature instruction from a user captured by a camera of the unmanned logistics vehicle, wherein the feature instruction indicates that the goods have been unloaded from the unmanned logistics vehicle and instructs the unmanned logistics vehicle to depart; and
    controlling, by the control system, the unmanned logistics vehicle to drive away from the pickup location upon recognizing the feature instruction, wherein
    the feature instruction includes at least one of: a voice instruction, a body movement instruction, a fingerprint unlocking instruction, or a facial expression instruction.

2. The method according to claim 1, further comprising:
    controlling, by the control system, the unmanned logistics vehicle to drive away from the pickup location when no feature instruction is received within a preset staying time of the unmanned logistics vehicle.

3. The method according to claim 1, further comprising:
    controlling, by the control system, the unmanned logistics vehicle to drive away from the pickup location upon detecting a distance between the user and the unmanned logistics vehicle exceeding a preset distance.

4. The method according to claim 3, further comprising:
    controlling, by the control system, the unmanned logistics vehicle to drive away from the pickup location upon detecting that the user does not leave the unmanned logistics vehicle within a preset staying time of the unmanned logistics vehicle.

5. The method according to claim 1, wherein
    the feature instruction is preset or set by the user.

6. The method according to claim 1, wherein
    the feature instruction further includes an ID number of the goods.

7. The method according to claim 6, wherein
    the feature instruction is set by a user terminal at the shipping location, uploaded to a server, and sent to a user terminal at the pickup location by the server.

8. The method according to claim 6, wherein
    the feature instruction is set by a server and sent to a user terminal at the shipping location and a user terminal at the pickup location.

9. The method according to claim 1, further comprising:
    reminding, by the control system, the user to close a compartment door of the unmanned logistics vehicle prior to the unmanned logistics vehicle driving away from the target location.

10. The method according to claim 9, further comprising, prior to the controlling of the unmanned logistic vehicle to drive away from the pick-up location upon recognizing the feature instruction:
    determining, by the control system, a state of the compartment door; and
    controlling, by the control system, the unmanned logistics vehicle to drive away from the pickup location in response to the determining of the state of the compartment door is closed.

11. A control system for controlling an unmanned logistics vehicle, comprising:
    a microphone;
    a camera; and
    an on-broad terminal, wherein
    the microphone, the camera and the on-broad terminal are integrated to the unmanned logistics vehicle,
    the on-broad terminal includes:
        at least one storage medium storing a set of instructions for controlling the unmanned logistics vehicle, and
        at least one processor in communication with the at least one storage medium, wherein during operation, the at least one processor executes the set of instructions to:
            control the unmanned logistics vehicle to drive away from a shipping location to a pickup location upon determining that goods have been loaded on the unmanned logistics vehicle,
            determine the unmanned logistics vehicle arrives at the pickup location,
            recognize a feature instruction from a user captured by the camera, wherein the feature instruction indicates that the goods have been unloaded from the unmanned logistics vehicle and instructs the unmanned logistics vehicle to depart, and
            control the unmanned logistics vehicle to drive away from the pickup location upon recognizing the feature instruction, wherein the feature instruction includes at least one of: a voice instruction, a body movement instruction, a fingerprint unlocking instruction, or a facial expression instruction.

12. The control system according to claim 11, further comprising:
a user terminal at the shipping location;
a user terminal at the pickup location; and
a server.

13. The control system according to claim 12, wherein the feature instruction is recognized by the at least one processor; or
the feature instruction is recognized by the server.

14. The control system according to claim 11, wherein the at least one processor further executes the set of instructions to:
control the unmanned logistics vehicle to drive away from the pickup location when no feature instruction is received within a preset staying time of the unmanned logistics vehicle.

15. The control according to claim 11, wherein the at least one processor further executes the set of instructions to:
control the unmanned logistics vehicle to drive away from the pickup location upon detecting a distance between the user and the unmanned logistics vehicle exceeding a preset distance.

16. The control according to claim 15, wherein the at least one processor further executes the set of instructions to:
control the unmanned logistics vehicle to drive away from the pickup location upon detecting that the user does not leave from the unmanned logistics vehicle within a preset staying time of the unmanned logistics vehicle.

17. The control according to claim 11, wherein
the feature instruction is preset or set by the user.

18. The control system according to claim 11, wherein
the feature instruction further includes an ID number of the goods.

19. The control system according to claim 18, wherein
the feature instruction is set by the user terminal at the shipping location, uploaded to the server, and sent to the user terminal at the pickup location by the server.

20. The control system according to claim 18, wherein
the feature instruction is set by the server and sent to the user terminal at the target location.

* * * * *